US008638004B2

(12) United States Patent
Badger

(10) Patent No.: US 8,638,004 B2

(45) Date of Patent: Jan. 28, 2014

(54) APPARATUS AND METHOD FOR PRODUCING ELECTRIC POWER FROM INJECTION OF WATER INTO A DOWNHOLE FORMATION

(76) Inventor: Omer R. Badger, Winnemucca, NV (US)

( * ) Notice: Subject to any disclaimer, the term of this patent is extended or adjusted under 35 U.S.C. 154(b) by 255 days.

(21) Appl. No.: 13/276,124

(22) Filed: Oct. 18, 2011

(65) Prior Publication Data

US 2012/0091711 A1 Apr. 19, 2012

Related U.S. Application Data

(60) Provisional application No. 61/394,544, filed on Oct. 19, 2010.

(51) Int. Cl.

*F03B 13/00* (2006.01)
*F03B 13/10* (2006.01)
*H02P 9/04* (2006.01)

(52) U.S. Cl.

USPC .......................................................... 290/43

(58) Field of Classification Search

USPC ........................................ 290/43, 42, 53, 54

See application file for complete search history.

(56) References Cited

U.S. PATENT DOCUMENTS

| | | | | |
|---|---|---|---|---|
| 4,496,845 | A | 1/1985 | Ensign et al. | |
| 8,033,328 | B2 * | 10/2011 | Hall et al. | 166/65.1 |
| 2002/0180215 | A1 | 12/2002 | Mitchell | |
| 2008/0190106 | A1 | 8/2008 | Mak | |
| 2009/0121481 | A1 | 5/2009 | Riley | |

* cited by examiner

*Primary Examiner* — Javaid Nasri

(74) *Attorney, Agent, or Firm* — Bushman & Associates, P.C.

(57) ABSTRACT

An apparatus and method for generating electricity from a liquid flowing in a generally vertical direction down a borehole. There is a turbine disposed at a subsurface position and having an intake and a discharge, the turbine being mechanically coupled via an output shaft to an electric generator such that rotation of the output shaft drives the generator to produce electric power. A control valve assembly is positioned below the turbine, the control valve assembly including a valve adapted to receive water discharged from the turbine and a control system operatively connected to the valve for throttling the valve in response to the rate of flow of liquid to the turbine to maintain the rotation of the turbine in a predetermined RPM range.

10 Claims, 3 Drawing Sheets

APPARATUS AND METHOD FOR PRODUCING ELECTRIC POWER FROM INJECTION OF WATER INTO A DOWNHOLE FORMATION

CROSS REFERENCE TO RELATED APPLICATION

This application claims priority to U.S. Patent Application Ser. No. 61/394,544 filed on Oct. 19, 2010, the disclosure of which is incorporated herein by reference for all purposes.

FIELD OF THE INVENTION

The present invention relates to hydroelectric generation of power and, more particularly, to the generation of electric power from injection of water into a well.

BACKGROUND OF THE INVENTION

There is a rapidly growing need for environmentally acceptable systems for generating electric power. Clearly, hydroelectric power is one such system. Further, there are many instances when water from various sources must be disposed of in ways that are not deleterious to the environment. One method of dealing with the disposal of water is to inject it into underground reservoirs or other formations.

There are many existing injection wells in the municipal, agricultural, industrial, petroleum, mining and energy oil fields. In some of these injection wells, water falls a considerable distance to the static water level. In cases where the injected water is falling to a sufficient depth, at a sufficient volume, a turbine with a connection to a generator may be installed to recover this energy.

Injection wells are also common in aquifer storage and recovery systems used by many water districts, where the right geologic conditions exist. They are also common in geothermal production where the water/brine is re-circulated to mine more of the heat in the strata. Further, some mines inject dewatering effluent.

SUMMARY OF THE INVENTION

It is one object of the present invention to provide an apparatus and method for generating electric power.

Another object of the present invention is to generate electric power from the injection of water down a well and into a subsurface formation.

In still another aspect of the present invention there is provided an apparatus and method for generating electric power using a turbine disposed in a downhole location and mechanically coupled to an electric generator.

In still another aspect of the present invention there is provided a method for generating electric power by introducing a liquid into a turbine disposed in a downhole location and mechanically coupled to an electric generator.

In still a further aspect of the present invention there is provided a method for generating electric power by introducing a liquid into a turbine disposed downhole and mechanically connected to an electric generator by controlling the flow of water through the turbine.

DESCRIPTION OF THE PREFERRED EMBODIMENTS

While the present invention will be described with respect to the use of water as the motive force, it will be understood that in certain instances, other liquids may also be used.

Figure 1:
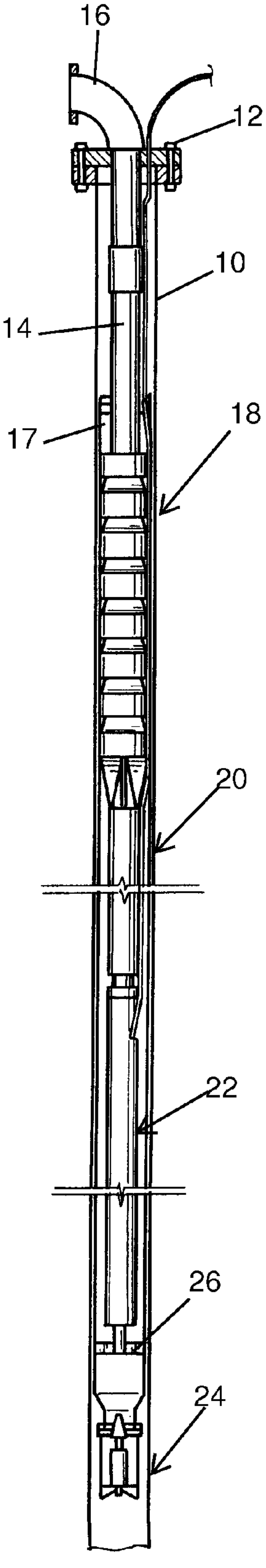
FIG. 1 is an elevational view of one embodiment of the apparatus of the present invention.

Referring to FIG. 1, the apparatus of the present invention is shown disposed in a casing 10. It will be understood that casing 10 will be positioned in a borehole; i.e., an injection well or the like. Casing 10 extends from a wellhead assembly 12, which is comprised of mating flanges bolted together. Positioned in casing 10 is a tubing string 14, tubing string 14 being connected to a flanged inlet pipe 16 into which water from a source not shown is injected.

In general, tubing string 14 suspends a tubular shroud 17, a turbine shown generally as 18, a labyrinth seal shown generally as 20, a generator shown generally as 22 and a control valve assembly shown generally as 24. A centralizer 26 serves to maintain the tubing string 14 concentric with respect to the tubular shroud 17.

While in the embodiment shown, the generator 22 is disposed downhole, it will be appreciated by those skilled in the art that the generator could be located at the surface and mechanically coupled to the output shaft of the turbine via a line shaft.

Figure 2A:
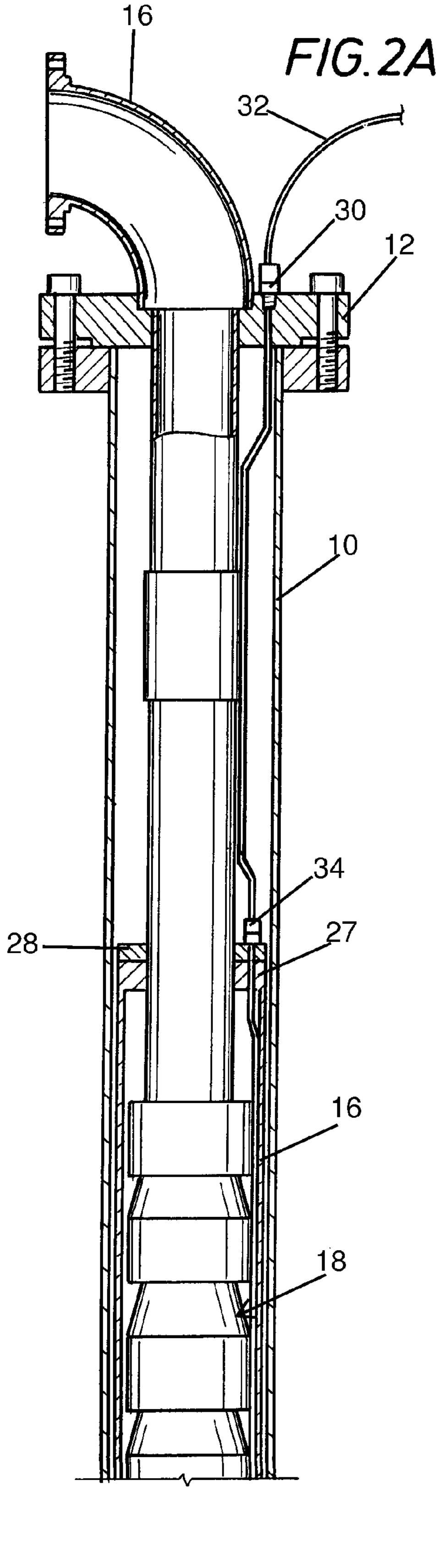
FIG. 2A is an enlarged, elevational view of the upper portion of the apparatus shown in FIG. 1.

Referring now to FIG. 2A, the upper portion of the apparatus shown in FIG. 1 is shown in an enlarged view. Shroud 17 is suspended from a shroud hanger 27 below a pack-off assembly 28 and serves to ensure that injected water passes through turbine 18 to drive turbine 18 and to act as a coolant. Extending through a fitting 30 in wellhead 12, is an electric power cable 32, power cable 32 also extending through a fitting 34 in pack-off assembly 28 and shroud hanger 26, power cable 32 being connected to generator 22 (see FIG. 2B). Turbine 18 is a submersible turbine pump, as for example, of the type marketed by Gould Pumps, operated in reverse. Such pumps are generally multi-staged, centrifugal pumps, or specially constructed vane-type turbines. Pressure from flowing water pushes against the vanes, causing them to rotate which in turn rotates an output shaft forming part of the turbine.

Figure 2B:
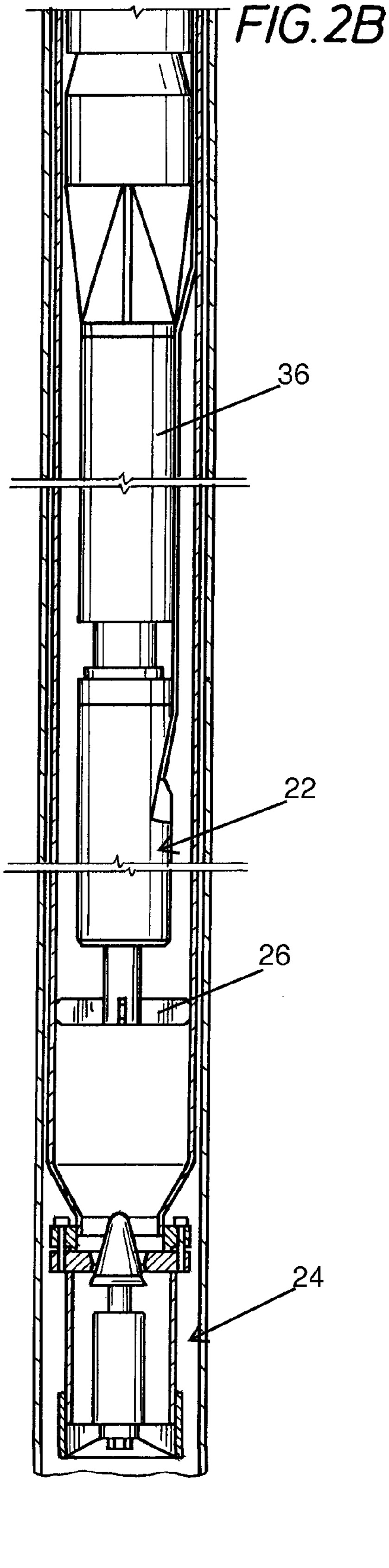
FIG. 2B is an enlarged, elevational view of the lower portion of the apparatus shown in FIG. 1.

Referring now to FIG. 2B, water passing through turbine 18 flows past labyrinth seal 20, generator 22 and centralizer 26 into control valve assembly 24, described more fully hereafter. The output shaft of turbine 18 is mechanically connected to generator 22. Accordingly, as turbine 18 rotates, the output shaft thereof rotates and in turn drives generator 22, which, when operated at a correct speed and provided with enough input force, produces electric power.

Connected to the bottom of shroud 17 is a valve assembly 24, through which water discharged from turbine 18 flows into casing 10 to a suitable downhole formation.

Figure 3:
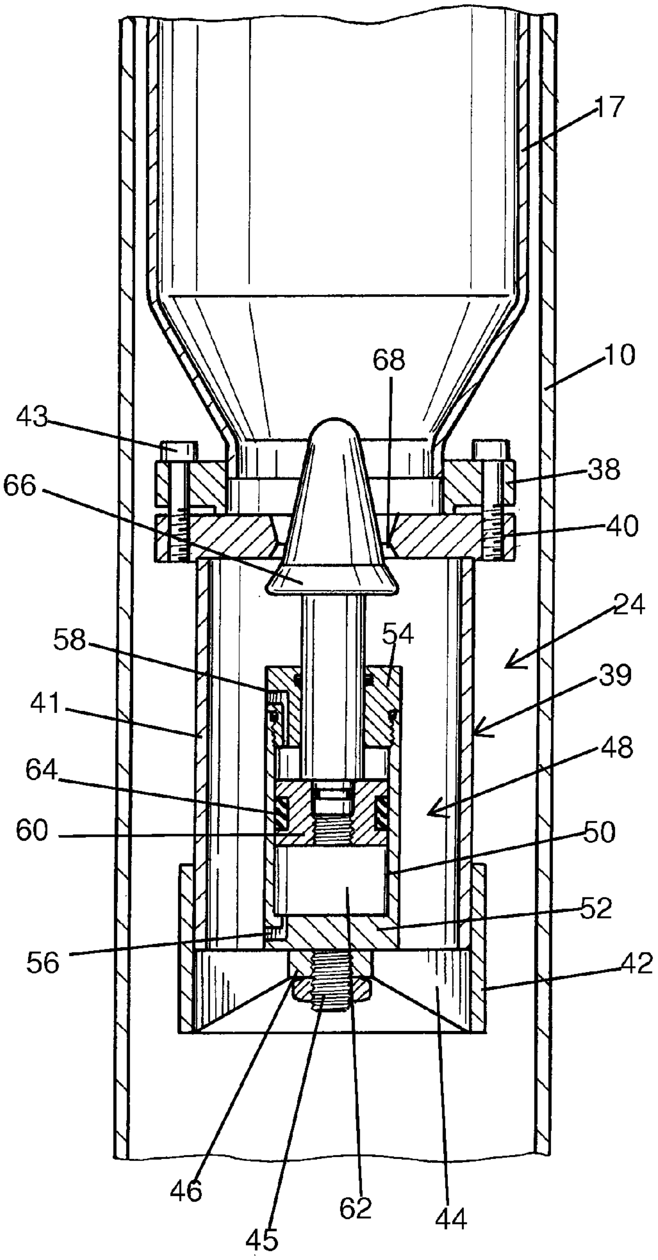
FIG. 3 is an enlarged view of one embodiment of a control valve used in the apparatus and method of the present invention.

Referring now to FIG. 3, valve assembly 24 is shown in greater detail. As can be seen, a flange 38 is connected to the bottom of shroud 17. Control valve assembly 24 comprises an outer housing shown generally as 39, which comprises a tubular portion 41 connected on its upper end to a flange 40, which is connected via bolts 42 to flange 38. Connected to the lower end of the tubular portion 41, is a support collar 42, support collar 42 being provided with a series of radially inwardly projecting ribs 44, and a centrally located boss 46 and defining an outlet between ribs 44.

Disposed in housing 40 is a control valve 48, control valve 48 comprising a body comprised of a tubular portion 50, a bottom wall 52, and a valve bonnet 54, tubular portion 50 being threadedly connected to valve bonnet 54. Bottom wall 52 of valve body is mounted in boss 46 by means of a nut on a threaded stud 45 extending down from wall 52 through a bore in boss 46. It will be understood that water falling through valve assembly 24 falls past ribs 44 into casing 10 and ultimately into a downhole formation.

Bottom wall 52 has a threaded port 56, which is connected to a hydraulic line (not shown). Bonnet 54 also has a threaded port 58, also connected to a hydraulic line (not shown). A piston 60 is disposed in a valve chamber 62 formed by tubular portion 50, bottom wall 52 and bonnet 54. Piston 60 reciprocates in chamber 62 and is sealed with an annular seal 64 against the interior wall of tubular portion 50. Piston 60 is in turn connected to a valve element 66, which reciprocates in response to reciprocation of piston 60. As can be seen, flange 40 forms a valve seat 68 against which valve element 66 can seal when moved sufficiently upward by the force of hydraulic fluid in the lower portion of chamber 62 acting against the bottom of piston 60. As noted, although not shown it will be appreciated that hydraulic lines connected to ports 56 and 58 extend to the surface to a hydraulic power/control system.

Figure 4:
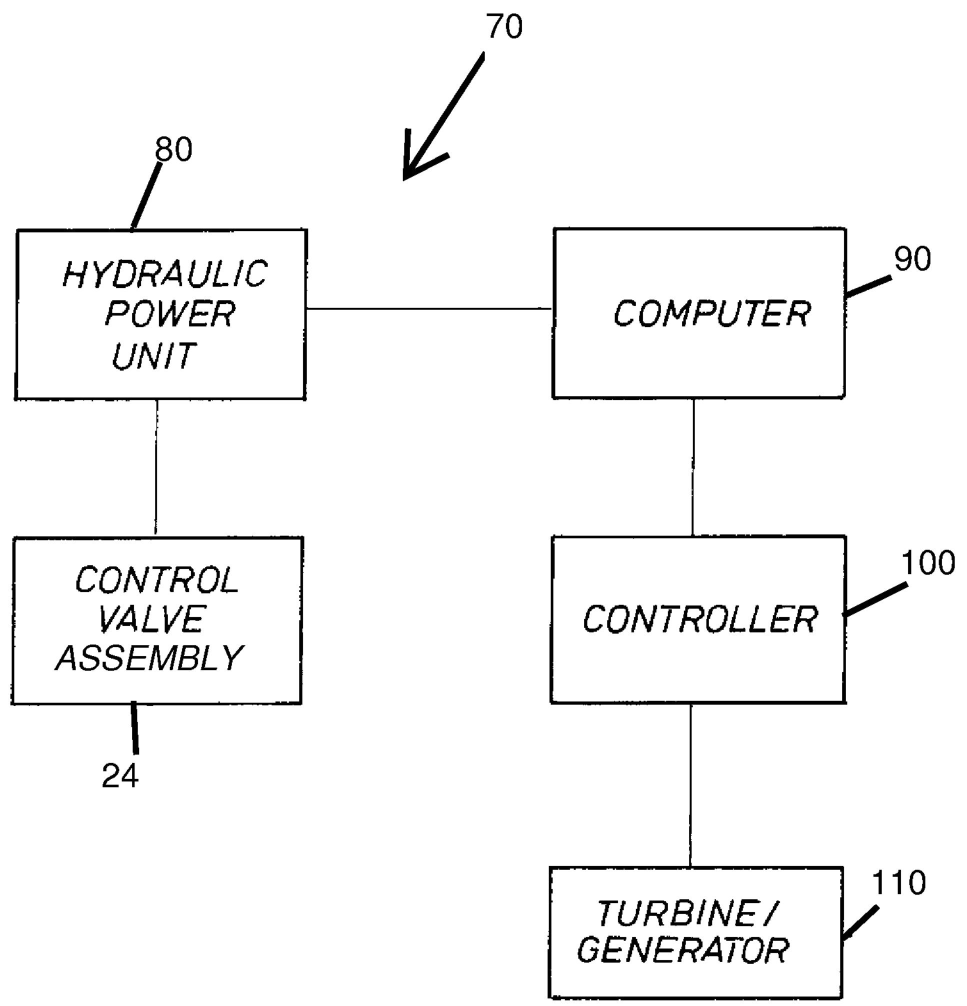
FIG. 4 is a schematic block diagram of one embodiment of the apparatus and method of the present invention.

Referring now to FIG. 4 there is shown a schematic control system for use in the apparatus and method of the present invention. At the outset, it should be noted that the present invention utilizes an existing high head at a much lower volume or flow rate, as compared with high volumes or flow rates with a relatively low head found in most similar hydroelectric generating systems. In this regard, prior art, gravity flow systems for hydroelectric power generation generally use a flow rate in excess of 10,000 gallons per minute with a head of less than 500 feet. In the method of the present invention, the flow rate can be less than about 5,000 gallons per minute while the head is greater than about 1,000 feet.

Further, one of the aspects of the present invention is the ability to contain the proper flow rate through the turbine 18 to optimize electric power output from the generator 22. To do this, the rate of flow through the turbine is controlled such that the turbine 18 rotates in a predetermined RPM range. As will be well understood by those skilled in the art, the predetermined RPM range will be that which is optimal based on the specific turbine pump used and the generator.

Returning then to FIG. 4, there is a central valve system, shown generally as 70, comprised of control valve assembly 24, a hydraulic power unit 80 operatively connected to control valve assembly 24, a computer 90, a controller 100 and the turbine/generator system 110. As water is injected into tubing 14 and as noted above, it rotates turbine 18 which, being mechanically connected to generator 22, drives generator 22 to produce electric power. However, as noted, it is important to control the head pressure on the turbine such that the turbine 18 rotates at the optimal speed. Accordingly, in operation, water flowing down tubing 14 drives turbine 18 which in turn drives generator 22, the falling water from turbine 18 flowing around seal 20 and generator 22 into valve assembly 24 and ultimately into casing 10 to a subsurface formation. Turbine/generator 110 is in communication with controller 100, which collects all data from turbine generator 110, the data being sent to computer 90 for processing, computer 90 sending control signals to hydraulic power unit 80, which in turn controls the operation of valve 48.

In operation, if turbine 18 is rotating too fast, valve 48 will be throttled back slowing the release of water into casing 10 and thereby slowing the speed at which turbine 18 is rotating. It could be apparent that when it is desired to slow the release of water from the system, hydraulic fluid will be introduced into the lower portion of chamber 62 to drive piston 60 and valve element 66 upwardly toward valve seat 68. Conversely, if it is desired to release more water, hydraulic fluid is introduced into inlet 58 to drive piston 60 downwardly, allowing more flow area between valve element 66 and valve seat 68 and conventionally more flow into casing 10.

It will be recognized that while the system of the present invention is dynamic in the sense that the flow of water is constantly being monitored and controlled, it is static in the sense that only head pressure and gravity flow are used as opposed to water being injected under pressure; e.g., pumped down hole.

Also note, while the apparatus and method of the present invention has been described with reference to both the turbine and generator being disposed downhole and in the casing, it will be appreciated that the generator could be at the surface and connected with a lineshaft to the turbine.

Further, while valve 48 as shown is generally of the needle valve type, it will be appreciated that other type of valves such as sleeve valves may also be employed. In fact, it is only necessary that the valve be of the type which can be controlled; i.e., throttled, as necessary to optimize turbine speed and hence electric power output from the generator.

The foregoing description and examples illustrate selected embodiments of the present invention. In light thereof, variations and modifications will be suggested to one skilled in the art, all of which are in the spirit and purview of this invention.

What is claimed is:

1. An apparatus for hydroelectric power generation comprising:

a tubing having a liquid input at a first, upper location;

a turbine having an intake and a discharge, said intake being connected to said tubing and located at a second, lower position for receiving a flow of liquid introduced into said turbine, said turbine having a rotatable output shaft;

an electric generator mechanically coupled to said output shaft whereby rotation of said output shaft by said turbine drives said generator to produce electric power; and a control valve assembly disposed below said turbine, said control valve assembly comprising:

a valve having an input connected to said discharge for receiving water discharged from said turbine;

a control system operatively connected to said valve for throttling said valve in response to the rate of flow of liquid through said turbine to maintain the rotation of said turbine in a predetermined RPM range.

2. The apparatus of claim 1, wherein said turbine comprises a submersible turbine pump operated in reverse.

3. The apparatus of claim 2, wherein said turbine pump is a multi-stage centrifugal pump.

4. The apparatus of claim 1, wherein said generator is disposed below said turbine.

5. The apparatus of claim 4, wherein there is an electric power cable connected to the output of said generator.

6. The apparatus of claim 1, wherein said control system comprises a hydraulic power unit operatively connected to said valve, a controller operatively connected to said turbine and said generator for collecting data from said turbine and said generator, and a computer for processing said data and for sending control signals to said hydraulic power unit to throttle said valve.

7. A method for generating electricity, comprising:

positioning a turbine having an intake, a discharge and an output shaft at a subsurface location in an earth borehole;

mechanically connecting said output shaft to an electric generator whereby rotation of said output shaft drives said generator;

connecting said intake of said turbine to a source of liquid from the surface;

positioning a control valve assembly below said turbine, said control valve assembly comprising a valve having an inlet and an outlet;

connecting said discharge of said turbine to said inlet of said valve assembly whereby liquid from said turbine flows through said valve;

introducing a flow of said liquid into said turbine from said source, said liquid flowing by gravity into the input of said turbine; and controlling the rate of flow of liquid through said turbine by throttling said valve to maintain the rotation of said turbine within a predetermined RPM range.

8. The method of claim 7, further comprising:

positioning a casing in said earth borehole, said casing extending from the surface to a desired subsurface depth.

9. The method of claim 7, further comprising:

connecting the input of said turbine to a tubing connected to said source of liquid.

10. The method of claim 7, wherein the flow rate into said inlet of said turbine is less than about 5,000 gallons per minute at a head of greater than about 1,000 feet.

* * * * *